US008370623B2

(12) United States Patent
Jain et al.

(10) Patent No.: US 8,370,623 B2
(45) Date of Patent: Feb. 5, 2013

(54) SECURE TUNNEL OVER HTTPS CONNECTION

(75) Inventors: Vikas Jain, Haryana (IN); Madan Appiah, Redmond, WA (US); Kadirvel Vanniarajan, Hyderabad (IN); Samir Jain, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/323,393

(22) Filed: Dec. 12, 2011

(65) Prior Publication Data

US 2012/0089828 A1    Apr. 12, 2012

Related U.S. Application Data

(62) Division of application No. 11/561,947, filed on Nov. 21, 2006, now Pat. No. 8,086,845.

(51) Int. Cl.
H04L 29/06    (2006.01)
(52) U.S. Cl. ......................................... 713/151; 713/162
(58) Field of Classification Search .................. 713/151, 713/162
See application file for complete search history.

(56) References Cited

U.S. PATENT DOCUMENTS

| 5,745,884 A | 4/1998 | Carnegie et al. |
| 6,104,716 A | 8/2000 | Crichton et al. |
| 6,598,167 B2 | 7/2003 | Devine et al. |
| 6,816,462 B1 | 11/2004 | Booth, III et al. |
| 6,988,147 B2 | 1/2006 | King |
| 8,086,845 B2 | 12/2011 | Jain et al. |
| 2002/0046348 A1 | 4/2002 | Brustoloni |
| 2002/0136226 A1 | 9/2002 | Christoffel et al. |
| 2003/0033520 A1* | 2/2003 | Peiffer et al. ................ 713/153 |
| 2003/0065919 A1 | 4/2003 | Albert et al. |
| 2003/0177395 A1 | 9/2003 | Pardee et al. |
| 2003/0191843 A1 | 10/2003 | Balissat et al. |
| 2004/0184425 A1 | 9/2004 | Lai et al. |
| 2005/0044350 A1 | 2/2005 | White et al. |
| 2005/0132221 A1 | 6/2005 | Marcjan |

OTHER PUBLICATIONS

"VPN tunneling protocols", Microsoft Corporation 2006, http://www.microsoft.com/technet/prodtechnot/isa/2--4/help/FW_C_VPNProtocol.mspx?mfr=true, 3 pgs.
Carlson, C., "Tunnel of Secure Transmission", http://www.securitymanagement.com/library/000696.html, 6 pgs, Jul. 1999.
Chinese First Office Action mailed Jul. 3, 2011 in Chinese Application 200780035490.7, 7 pages.
Chinese Notice of Allowance in Application 200780035490.7, mailed Jan. 10, 2012, 4 pgs.
Li, S.; Kittel, A.; Jia, D.; Zhuang, G., 'Security Considerations for Workflow Systems', Network Operations and Management Symposium 2000, NOMS IEEE/IFIP, Apr. 10-14, 2000 pp. 655-668.
PCT International Report on Patentability in Application PCT/US2007/079007 mailed Mar. 31, 2009, 7 pgs.
PCT International Search Report and Written Opinion in Application No. PCT/US2007/079007, mailed Mar. 14, 2008, 11 pgs.

(Continued)

*Primary Examiner* — Jacob Lipman
(74) *Attorney, Agent, or Firm* — Merchant & Gould PC

(57) ABSTRACT

Many secure tunnels require protocols that require special handling, authorization or security certificates, such as L2TP and PPTP. This often eliminates them for use between a corporate or agency network and outside, public networks. A secure socket tunnel protocol (SSTP) adds drivers in both the kernel and user mode to route standard protocol traffic, such as PPP, over a common HTTPS port. In the event of network interruptions, an exchange of a session cookie allows fast reconnection of the underlying HTTPS connection without affecting higher level applications.

20 Claims, 4 Drawing Sheets

OTHER PUBLICATIONS

Shieh et al., Network Address Translators: Effects on Security Protocols and Applications in the TCP/IP Stack, IEEE, 2002, http://dsns.csie.nctu.edu.tw/ssp/docs/effects%20on%20security%20protocols%20and%20applications%20in%20the%20TCPIP%20stack.pdf#search=%22protocol%20carrying%20application%20payload%20over%20HTTP%20connection%20with%20VPN%20Protocols%20%20%E2%80%93%20IPSec%2C%20 PPTP%2C% 20and%20L2TP%22, 8 pgs.

U.S. Appl. No. 11/561,947, Amendment and Response filed Dec. 2, 2010, 13 pgs.

U.S. Appl. No. 11/561,947, Amendment and Response filed Apr. 19, 2011, 15 pgs.

U.S. Appl. No. 11/561,947, Amendment and Response filed Jun. 24, 2010, 12 pgs.

U.S. Appl. No. 11/561,947, Amendment and Response filed Aug. 10, 2011, 3 pgs.

U.S. Appl. No. 11/561,947, Final Office Action mailed May 24, 2011, 4 pgs.

U.S. Appl. No. 11/561,947, Final Office Action mailed Sep. 2, 2010, 7 pgs.

U.S. Appl. No. 11/561,947, Notice of Allowance mailed Aug. 22, 2011, 5 pgs.

U.S. Appl. No. 11/561,947, Office Action mailed Jan. 19, 2011, 7 pgs.

U.S. Appl. No. 11/561,947, Office Action mailed Mar. 24, 2010, 8 pgs.

* cited by examiner

SECURE TUNNEL OVER HTTPS CONNECTION

BACKGROUND

Communication between computers creates a point of vulnerability with respect to the security of the data traffic and, in some cases, even the endpoint computers themselves. Many techniques are available for addressing network security. Techniques exist for protecting application-to-application communication on a single logical connection, such as secure socket layer (SSL), often used for web browser to web server hypertext HTTP traffic. Other techniques exist to protect all data traffic between endpoints by protecting the network connection itself, rather than traffic between two applications. Examples of this are several forms of virtual private network, such as Point-to-Point Tunneling Protocol (PPTP) and Layer Two Tunneling Protocol (L2TP)/Internet Protocol Security (IPSec). A virtual private network encrypts at one end and decrypts at the other to secure all traffic between the endpoints from listening and man-in-the-middle attacks.

However, such secure protocols often require special set up, such as IPSec certificates or use not standard ports that tend to be blocked by firewalls at a corporate level. Tunneling traffic may be blocked at an Internet Service Provider (ISP) that blocks Generic Routing Encapsulation (GRE blocking). Yet another inconvenience to tunneled protocols is the use of network address translation (NAT) with locally-assigned IP addresses.

Additionally, even when a secure channel is created, an interruption in the lower-level connection, by either a routine timeout or network problem, may strand the upper level application connections. Recovering from such an interruption in service often requires application-to-application recovery after reconnection of the network.

SUMMARY

A tunneling protocol designed to be friendly to NAT and existing network security measures uses a secure tunneling protocol over a hypertext transport protocol secure (HTTPS) connection. As opposed to normal HTTPS connections, the secure tunneling protocol, designated secure socket tunneling protocol or SSTP, supports all network traffic between a computer and an associated server in the fashion of a standard protocol, for example, a point-to-point protocol (PPP). HTTPS is accommodated by virtually all firewalls and ISPs and is compatible with NAT. The SSTP protocol, described below, uses several techniques to present a full, standard, connection protocol to applications to use without modification or knowledge of the underlying connection. The SSTP maintains performance characteristics of other common protocols even with several traverses between kernel and user mode. Another aspect of SSTP supports exchange of a cookie between the client and server allowing a fast reconnection if the connection is dropped. This fast reconnect capability allows a connection to be re-established before applications are aware of any interruption.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
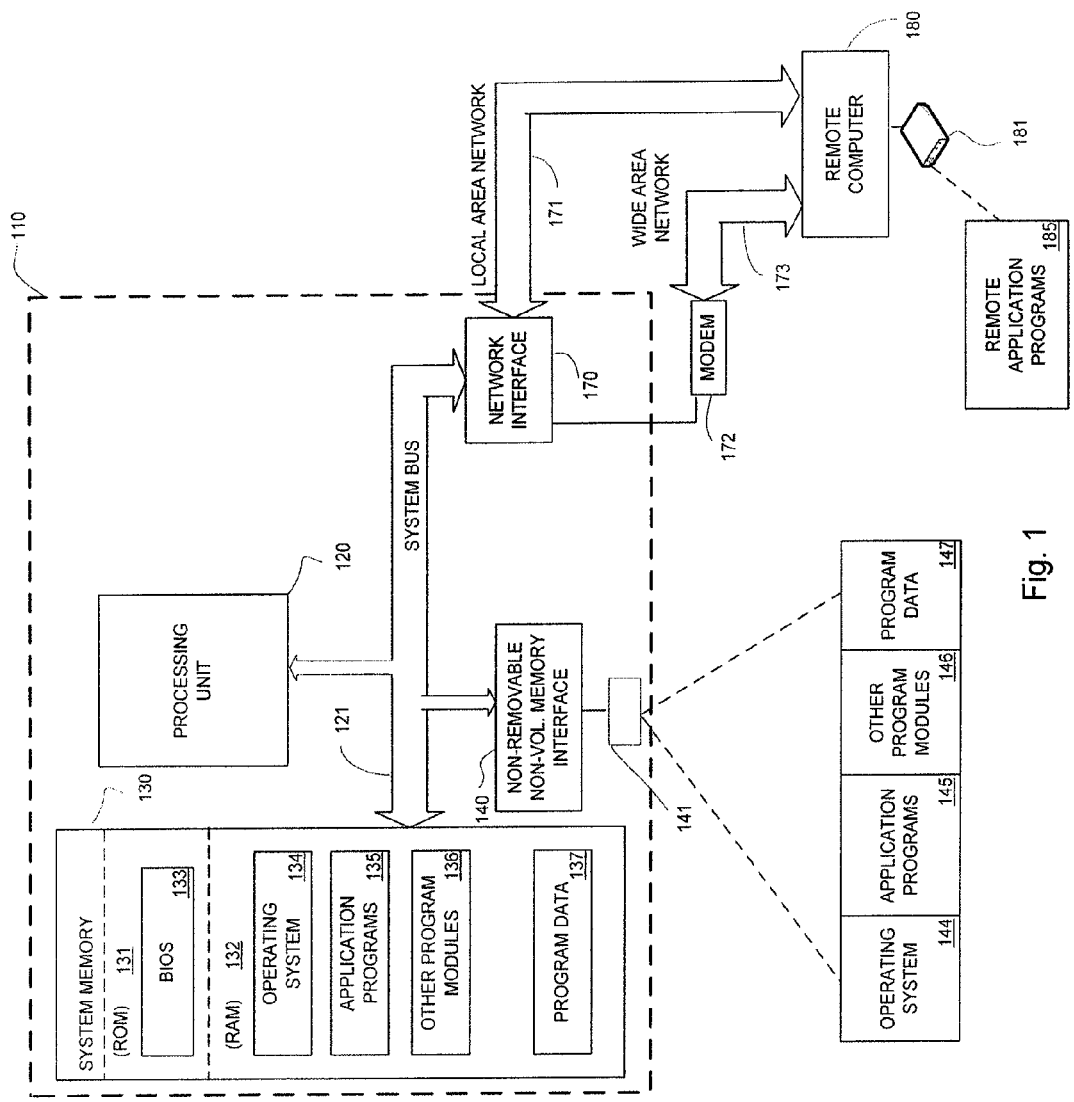
FIG. 1 is a simplified and representative block diagram of a computer suitable for implementing the current invention.

FIG. 1 illustrates a computing device in the form of a computer 110 that may host one or more of the embodiments of the current disclosure and is discussed in detail to provide a context for subsequent discussions.

Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 (telephone, cable, DSL, etc.) or other means for establishing communications over the WAN 173, such as the Internet. The modem 172, which may be internal or external, may be connected to the system bus 121, the network interface 170, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
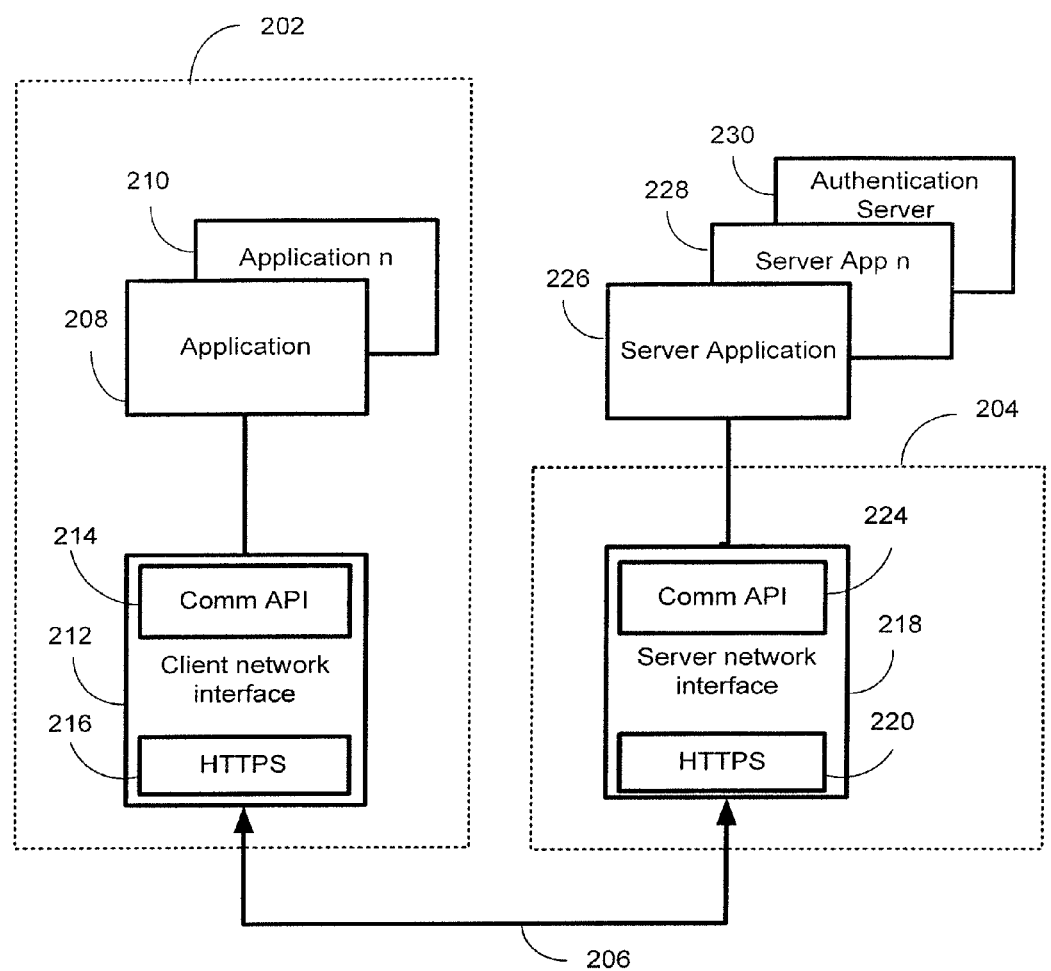
FIG. 2 is a simplified and representative block diagram of two computers connected via an SSTP connection.

FIG. 2 is a simplified and representative block diagram of two computers connected via an SSTP connection. A first computer 202, for example, a client computer supporting user applications such as mail, web browsing, database access, etc. may be coupled to a second computer 204. In an exemplary embodiment, the first computer 202 is outside a corporate or agency firewall or security zone. The second computer 204 may be a server supporting client-server communications for the applications on the first computer 20. However, in many embodiments, the second computer 204 may be a remote access server dedicated to supporting traffic from computers outside a corporate or agency firewall or security zone. The second computer 204 may be in a so called 'demilitarized zone' used to help secure interfaces between a protected network and outside entities attempting access to the protected network. The two computers 202 204 may be connected via network 206. Application 208 and other applications represented by application n 210 may send and receive data using client network interface 212. The client network interface 212 may present a communication API 214 to the applications 208 210. One example of the communication API is the point-to-point protocol (PPP). Any protocol can be supported as long as both sides agree to it. The client network interface 212 also includes an HTTPS module 216 for coupling to the network 206.

At the server side, a server network interface 218 corresponding to the client network interface 212 may include an HTTPS module 220 coupled to the network 206 and may also include a communication API 224 corresponding to the client network interface communications API 214. Communication API 224 may attach to one or more servers hosting applications 226 228 230. In one embodiment, one of the server applications may include an authentication server 230. The authentication server 230 may be used to authenticate client credentials during session startup, and may also include support for SSL key exchange as part of establishing the HTTPS session. Traffic between the second computer 204 and the various application servers 226 228 230 may be routed using normal IP/IPv6 routing protocols.

And an exemplary embodiment and application on the client, such as a web browser, may start up and connect with a network such as an ISP. A connection may be established to the server network interface 218 from the client network interface 212 to establish and SSTP tunnel. The SSTP tunnel will be discussed in more detail below. After establishing the secure SSTP tunnel the server network interface 218 may forward traffic to one or more of the server applications 226 228 230 using the agreed to protocol, for example PPP. In one exemplary embodiment, for example in a corporate environment, the authentication server 230 may be used to establish the identity of a user at the first computer 202. Once the user has been authenticated, user may be granted access to one or more corporate applications, such as e-mail, database access, corporate bulletin boards, etc.

Figure 3:
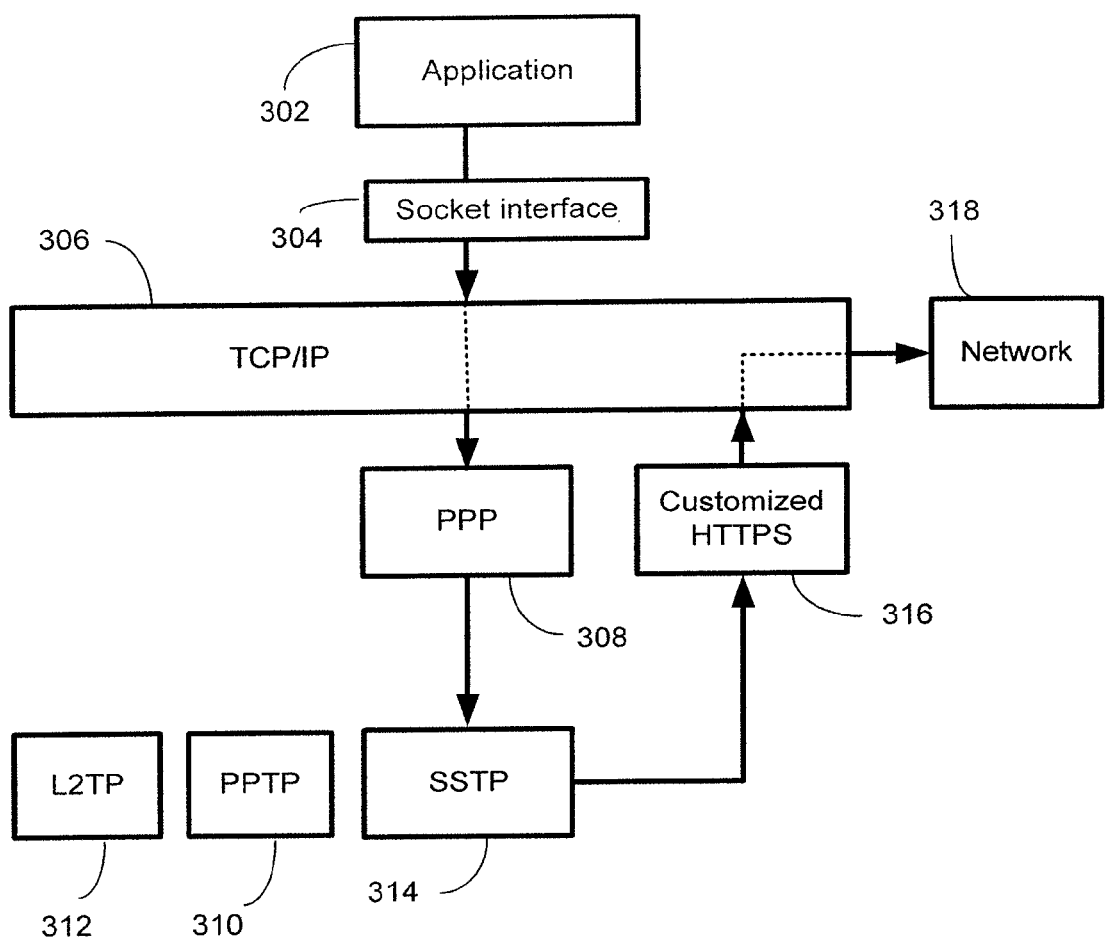
FIG. 3 is a simplified and representative block diagram of functional blocks supporting an SSTP connection.

FIG. 3 is an exemplary block diagram of functional blocks supporting an SSTP connection illustrating outbound traffic from either the first or second computers 202 204 of FIG. 2. Data transmission over the SSTP protocol may follow a three stage process: secure session establishment, SSTP control traffic, and SSTP data traffic. During the secure session establishment, a TCP connection may be made between the client and server followed by a standard SSL handshake, including Diffie-Hellman key exchange. This establishes the HTTPS session.

Once the HTTPS session is in place, an SSTP driver (SST-PDVR) may activate a state machine that manages the SSTP protocol. The PPP session negotiation may then be made over the SSTP connection. After the PPP session is in place, the channel is ready for tunneling application traffic via the PPP protocol.

After the initial session setup and security negotiation is complete, an application 302 may send data to a socket interface 304, such as a known Winsock interface. The socket interface 304 may pass the data down the protocol stack to the TCP/IP interface 306. The TCP/IP interface may then determine that the packet is destined for the SSTP tunnel and route the data to the appropriate protocol layer, in this embodiment, a PPP module 308. The SSTP protocol exists at the same level as other secure protocols such as PPTP 310 or L2TP 312. The PPP module 308 performs PPP framing and encapsulation passes the data to a dedicated SSTP module 314. The SSTP module 314 handles interactions between the kernel and user modes, performs specialized buffering, and supports the SSTP command set. The processed data is sent to the HTTPS module 316 for encryption using SSL and sent back to the TCP/IP interface 306. This time through, the TCP/IP interface 306 recognizes the traffic as standard HTTPS traffic and routes it to the network 318. The HTTPS traffic is widely used for such things as Internet commerce and is normally not blocked by ISPs or firewalls. When used with a web-proxy the HTTPS traffic will be forwarded to an appropriate port, such as standard HTTPS port 443.

Data over the secure tunnel using the SSTP protocol may include control traffic and data traffic. An exemplary command set for control and data traffic and their corresponding packet format follows.

The SSTP protocol consists of 2 type of packets
Control Packet (SCP—SSTP Control Packet)
Data Packet (SDP—SSTP Data Packet)

As the name implies, the control packet will be some channel specific control message and the data packet carries the data from the higher layer.

The SSTP protocol has a primary header which will be common across both the control and the data message.

```
typedef BYTE SSTP_PACKET_TYPE, *PSSTP_PACKET_TYPE;
#define SSTP_PACKET_TYPE_CONTROL    ((BYTE)0)
#define SSTP_PACKET_TYPE_DATA       ((BYTE)1)
#define SSTP_VERSION 1              ((BYTE)0x00010000)
typedef struct_SSTP_LENGTH
{
    USHORT     Reserved : 4;
    USHORT     Length : 12;
} SSTP_LENGTH, *PSSTP_LENGTH;
typedef struct_SSTP_HEADER
{
    BYTE              Version;
    BYTE              Reserved: 7;
    BYTE              ControlMessage: 1;
    SSTP_LENGTH       Length;
    union
    {
        SSTP_CONTROL_MESSAGE    ControlMessage;
        BYTE                    Payload [0]
    };
} SSTP_HEADER, *PSSTP_HEADER;
Version-1 Byte
Control/Data-1 byte with just the least significant bit being used.
The rest are reserved bits
Length-2 Bytes-Restricted to 12 bits
0         8            16    20    24           32
+--------+-----+---+-+------+-+-----+-----+-----+--
|Version |   Reserved |C|X|X|X|X| Length           |...
+--------+-----+---+-+------+-+-----+-----+-----+--
```

The Length field is the length of the SSTP packet excluding the SSTP_HEADER. It cannot exceed 4095 bytes. The SSTP protocol should not accept transmission requests (from higher layers—in our case PPP) exceeding this limit, as otherwise SSTP protocol will have to handle fragmentation.

Control Message Format

The SSTP control message, as discussed above, will be present after the SSTP_HEADER, provided the PacketType is SSTP_PACKET_TYPE_CONTROL. The control message will consist of a ControlMessageType and a number of attribute-length-value fields which form the complete control message. The control message types are defined as follows:

```
typedef enum _SSTP_CONTROL_MESSAGE_TYPE
{
    SSTP_MESSAGE_CONNECT_REQUEST,
    SSTP_MESSAGE_CONNECT_ACK,
    SSTP_MESSAGE_CONNECT_NACK,
    SSTP_MESSAGE_CALL_CONNECTED,
    SSTP_MESSAGE_FAST_RECONNECT_REQUEST,
    SSTP_MESSAGE_FAST_RECONNECT_ACK,
    SSTP_MESSAGE_ECHO_REQUEST,
    SSTP_MESSAGE_ECHO_RESPONSE,
    SSTP_MESSAGE_DISCONNECT,
    SSTP_MESSAGE_DISCONNECT_ACK,
    SSTP_MESSAGE_ABORT_CALL
} SSTP_CONTROL_MESSAGE_TYPE,
*PSSTP_CONTROL_MESSAGE_TYPE;
typedef struct _SSTP_CONTROL_MESSAGE
{
    USHORT     MessageType;
    USHORT     NumAttributes;
    BYTE       Attributes[0];
} SSTP_CONTROL_MESSAGE,
*PSSTP_CONTROL_MESSAGE;
0       8          16        24         32
+----+----+----+----+----+----+----+----+--
|Message Type      |   Num Attribute   |...
+----+----+----+----+----+----+----+----+--
typedef struct _SSTP_CONTROL_ATTRIBUTE
{
    BYTE Reserved;  // Can be used for metadata for attribute
    BYTE AttributeId;
    SSTP_LENGTH  AttributeLength;
    BYTE         Value[0]; // Of size AttributeLength bytes to fol-
                           low
} SSTP_CONTROL_ATTRIBUTE,
*PSSTP_CONTROL_ATTRIBUTE;
```

-continued

```
0       8       16      24      32
+----+----+----+----+----+----+----+----+---
|Reserved | AttribId |Rsvd| AttribLength |   Value
+----+----+----+----+----+----+----+----+------
typedef enum _SSTP_ATTRIBUTE
{
    SSTP_ATTRIBUTE_SUPPORT_FAST_RECONNECT,
    SSTP_ATTRIBUTE_LINK_COOKIE,
    SSTP_ATTRIBUTE_COMPLETION_STATUS,
    SSTP_ATTRIBUTE_ENCAPSULATED_PROTOCOL_ID
} SSTP_CTR_MSG_ATTRIBUTE,
*PSSTP_CTRL_MSG_ATTRIBUTE;
```

SSTP_ATTRIBUTE_SUPPORT_FAST_RECONNECT

This is a no-value attribute and the presence of this means the client is using a medium which is unreliable (like wireless) or the proxy has a time limitation on the connections and will require support for Fast-Reconnect. When this is negotiated, both the client and the server will not cleanup the connection context and indicate to upper layers, when the HTTPS medium goes down for some reason. The connection information will be persisted for some predefined duration before they get cleaned-up. If this is not negotiated, the connection context will be cleaned up immediately on detecting the loss of connectivity from the underlying medium. Note that the connection context will be maintained for fast-reconnect only if the underlying medium experiences an Abort of the TCP session.

This attribute also provides compatibility between implementations where Fast-Reconnect is not possible. This would prevent unnecessary persistence of the connection context in the unsupported scenarios.

SSTP_ATTRIBUTE_LINK_COOKIE

This attribute is an optional attribute which will be used in the Fast-reconnect scenario. When both the client and the server supports fast reconnect, the server will provide the link cookie to the client as a part of SSTP_MESSAGE_CONNECT_ACK. This is the cookie the client will need to pass as a part of SSTP_MESSAGE_FAST_RECONNECT_REQUEST for the server to identify the context to which this call needs to be associated to.

SSTP_ATTRIBUTE_COMPLETION_STATUS

This is used to indicate the completion status of a request. This can occur more than once in a control message. The value is of 8 bytes size with the following structure:

```
typedef struct _SSTP_ATTRIB_VALUE_COMPLETION_STATUS
{
    BYTE            Reserved[3];
    BYTE            AttribId;
    DWORD           Status;
    BYTE            AttribValue [0];
} SSTP_ATTRIB_VALUE_COMPLETION_STATUS,
*PSSTP_ATTRIB_VALUE_COMPLETION_STATUS;
```

In the NAK message, this attribute will provide more information on why a specific attribute is being rejected.

For eg, a server may response with AttribId SSTP_ATTRIBUTE_SUPPORT_FAST_RECONNECT and Status being ERROR_NOT_SUPPORTED to indicate that this feature is not supported by the server.

In the event, the original attribute has some specific value to which the server is not adhering, this attribute will have some value specific to the attribute being rejected starting with AttribValue. For example, if the client is negotiating for SSTP_ATTRIBUTE_ENCAPSULATED_PROTOCOL_ID with values A, B and C, if the server is not accepting B & C, it will send 2 COMPLETION_STATUS attribute with the AttribValue holding a USHORT of the protocol ID not being accepted. If in case the attribute value that is being rejected exceeds 64 bytes, the value size will be truncated to 64 bytes in the NAK message.

SSTP_ATTRIBUTE_ENCAPSULATED_PROTOCOL_ID

This specifies the protocol id that will be transmitted over the SSTP encapsulation. In a given message, there can be multiple of this attribute for all the various protocol IDs to be supported.

```
typedef enum _SSTP_ENCAPSULATED_PROTOCOL_ID
{
    SSTP_PROTOCOL_ID_PPP =1
} SSTP_ENCAPSULATED_PROTOCOL_ID,
*PSSTP_ENCAPSULATED_PROTOCOL_ID;
```

SSTP_MESSAGE_CONNECT_REQUEST

When a client tries to establish a SSTP session with the server, this will be the first message that gets sent out. This has the following attributes:

```
SSTP_ATTRIBUTE_SUPPORT_FAST_RECONNECT [Optional]
SSTP_ATTRIBUTE_ENCAPSULATED_PROTOCOL_ID
```

A client can resend this message with different values for the various attributes (or a different set of attributes) based on the outcome of the earlier request. There will be a predefined number of renegotiation of parameters after which the connection will be aborted.

SSTP_MESSAGE_CONNECT_ACK

This is sent in response to a connect request and it will have the link cookie in case of FAST_RECONNECT assigned by the server. Otherwise, this message will not have any attributes:

```
SSTP_ATTRIBUTE_LINK_COOKIE
SSTP_MESSAGE_CONNECT_NAK
```

This is sent in response to a connect request and it will have the list of attributes that are not accepted by the server. In response to a NAK, the client MUST send out a new CONNECT_REQUEST with all the attributes and their values that it wants. It cannot provide only the adjusted values. Unless the server is ACKing, it will not store the attribute values passed by the client.

SSTP_MESSAGE_CALL_CONNECTED

This will be sent by the client to complete the handshake with the server in response to SSTP_MESSAGE_CONNECT_ACK. This doesn't have any attributes associated with it.

SSTP_MESSAGE_FAST_RECONNECT_REQUEST

This will be used by a client to do a fast-reconnect (if it had already negotiated). This will have the SSTP_ATTRIBUTE_LINK_COOKIE which denotes the existing link cookie value.

SSTP_MESSAGE_FAST_RECONNECT_ACK

This will be sent by the server to the client in the event of a successful Fast Reconnect. If the fast-reconnect wasn't successful, the server will abort the connection with ABORT request.

SSTP_MESSAGE_ECHO_REQUEST

This is a keep-alive message and it doesn't have any associated attributes.

SSTP_MESSAGE_ECHO_RESPONSE

This is a keep-alive message sent in response to the echo request and it doesn't have any attributes associated. If the response has not been received from the remote site for 3 iterations and there is no data traffic flowing, the connection will be aborted.

SSTP_MESSAGE_DISCONNECT

This will be sent by either the client/server to initiate disconnect. All the data packets received from the server after a disconnect request has been sent will be dropped. This can optionally have a SSTP_ATTRIBUTE_COMPLETION_STATUS. After the disconnect request has been sent to the remote site, the local site should wait for a disconnect timeout or until the disconnect ACK is received. There won't be any retransmission done.

SSTP_MESSAGE_DISCONNECT_ACK

This will be sent by either the client or server, after receiving the SSTP_MESSAGE_DISCONNECT from the remote site. This will not have any attributes.

SSTP_MESSAGE_ABORT_CALL

This will be sent whenever there is a failure in the basic SSTP negotiation. It could be failure to converge on the connect request parameters or it could be due to failure to match the fast reconnect cookie to a connection context. This will have the SSTP_ATTRIBUTE_COMPLETION_STATUS to indicate the reason for the failure.

Data Message Format

When the ControlMessage bit is OFF, the payload will represent the protocol data negotiated. Note that, as discussed above, one embodiment supports only the payload of one protocol. However, in another embodiment, the SSTP channel protocol may be used to route packets of heterogeneous protocols.

Figure 4:
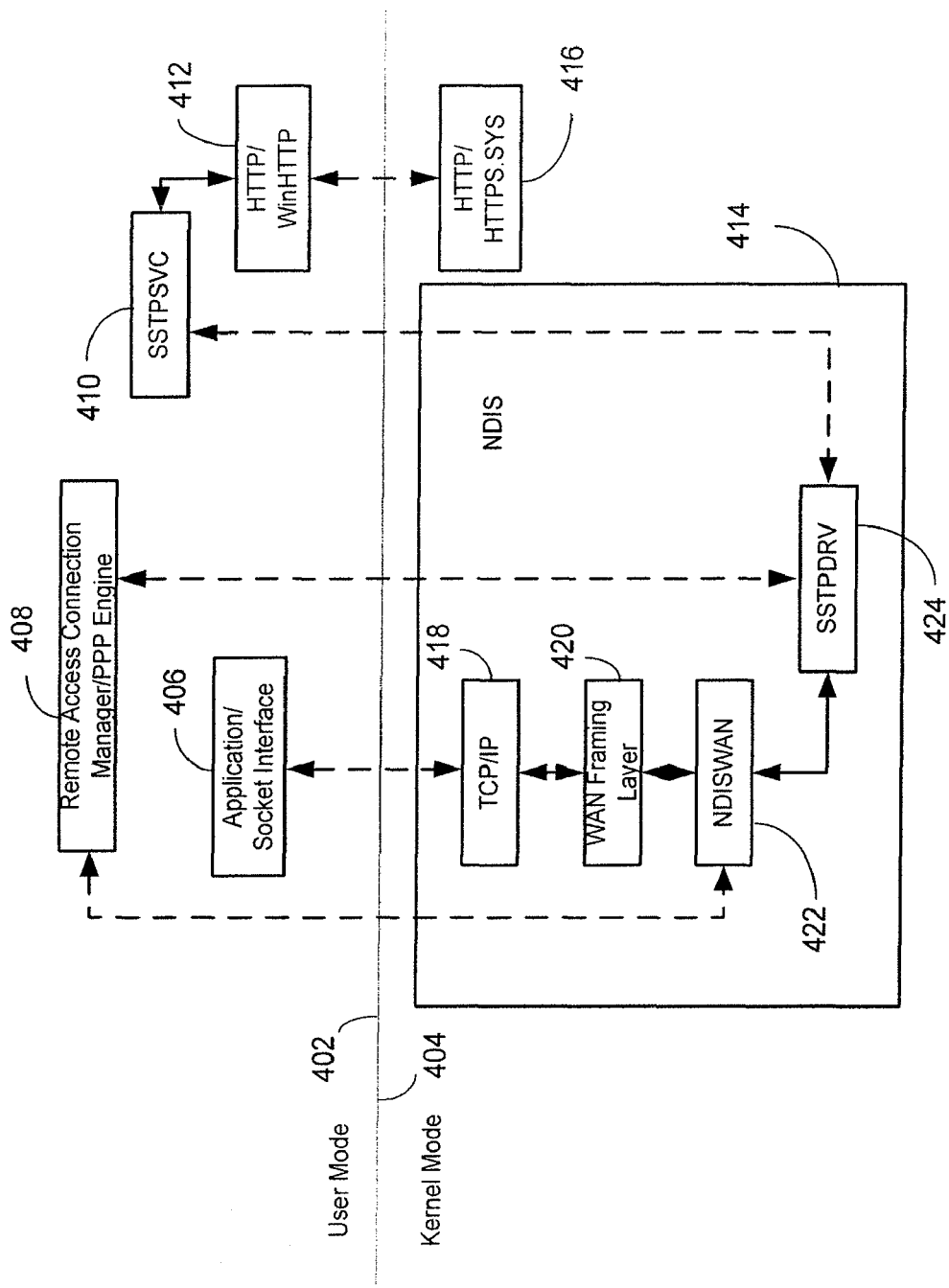
FIG. 4 is a simplified and representative block diagram of functional blocks supporting one embodiment of an SSTP connection.

FIG. 4 is a simplified and representative block diagram of functional blocks supporting one embodiment of an SSTP connection showing the relationships of the functional blocks with respect to user and kernel modes of operation. This figure is used to illustrate in more detail the control and data traffic associated with the SSTP protocol.

User mode modules 402 support all user applications and are restricted from direct access to hardware. Kernel mode modules 404 maintain control over all hardware resources and are the only modules to have direct access to hardware, such as a network interface. In this illustrative figure, the user mode modules are the application/socket interface 406, the remote access connection manager and PPP engine 408 (RASMAN), the SSTP service 410 (SSTPSVC) and the HTTP/WinHTTP module 412.

Kernel mode modules include the network driver interface specification 414 (NDIS) that is the definition of application to hardware network protocols and the HTTP/HTTPS system files 416. The NDIS includes the TCP/IP module 418, the wide area network framing module 420, the NDIS wide area network module 422, and the SSTP driver 424 (SSTPDRV). The dashed lines of FIG. 4 indicate trans-mode connections, while solid lines indicate connections within a mode.

In operation, after the HTTPS session is successfully established (e.g. a TCP connection+SSL handshake), the SSTPSVC 410 at a first computer, e.g. first computer 202 of FIG. 2, will setup the session context with the remote site, for example, second computer 204 of FIG. 2. That is, after the SSL hand-shake is done, the SSTPSVC 410 will trigger contextual setup activity within the HTTPS module. After this is done, the SSTPDRV 424 will then start an SSTP finite state machine over the HTTPS session. During this phase only SSTPDRV/SSTPSVC 410 424 and HTTPS 416 modules are interacting. Once this setup is complete, a binding will be created between the NDISWAN 422 and the SSTP session. The remote access connection manager (RASMAN) 408 be notified of the SSTP session by the NDISWAN and initiate the PPP negotiation over the SSTP connection. The PPP finite state machine is in the RASMAN 408 (within a loaded PPP module). The PPP control packet will be passed directly from RASMAN 408 to the NDISWAN 422. The NDISWAN 422 will pass it to SSTPDRV 424. The SSTP driver will hand over the packet to SSTPSVC 410 and the SSTPSVC 410 will pass it on to HTTPS module 412. In a normal manner, the HTTPS module 412 passes the data to the TCP/IP module 418 for routing over the network. There will be an outstanding PUT request with just the initial header sent to the remote server. The server will immediately reply back with a PUT response. The PUT request continuation (as entity body) will form the client-to-server data traffic and the response entity body will be the server-to-client data traffic. After the headers are exchanged, the SSTP protocol is available for use. Only after the PPP negotiation is complete is the channel ready for tunneling application traffic.

When the channeling tunnel (i.e. the SSTP session) is ready, data traffic may be carried over the link. The kernel mode TCP/IP module 418 accepts traffic in the form of a data packet from the application and socket interface 406 in the user mode. The TCP/IP module 418 identifies that the packet is to routed through the SSTP tunnel and hands it over to the WAN mapping module 420. The WAN mapping module 420 may get the connection (SSTP) mapping to the correct interface and passes it to the NDISWAN module 422. This is roughly the equivalent to PPP module 308 of FIG. 3. The NDISWAN is responsible for PPP framing and compression. Any encryption that might be done at a PPP module at this layer is turned off because it will be SSL encrypted. From this point on, the sequence of operations will be the same as the control traffic above, that is, to the RASMAN 408, SSTPDRV 414, SSTPSVC 410 and HTTPS module 416. Once the SSTP/PPP encapsulated data bytes reaches the HTTPS module, the HTTPS module will send it over the TCP connection (default port 443) after doing SSL encryption. So the packet again comes to TCP/IP module 418 from the user-mode HTTPS module but the routing will determine this traffic to go over the Ethernet interface (not depicted) instead of to the WAN framing module 420 as with the original application data.

A goal for SSTP to meet similar performance characteristics of other tunneled protocols, such as number of connections, connection time, and bandwidth, may require optimizations to overcome the several traverses between user and kernel mode. Specifically, in traversing the several additional modules of the SSTP protocol, performance may be increased by avoiding unnecessary buffer copies, paging, context switches and out-of-order sends/receives. Additionally, performance may be increased by assuring that fair bandwidth is available to other protocols, that is, that the SSTP tunnel does not run away.

Since the SSTPSVC 410 is responsible for send/receive, its buffers for send/receive are also available in the user-mode. In order to avoid buffer copy as well as to avoid any paging operations associated with the user-mode buffers, the send operation will be a PULL operation from the SSTPSVC and the receive operation will be a PUSH from the SSTPSVC. This will ensure the buffer is available to the kernel mode SSTPDRV 424 without incurring additional context switches or paging operations. The context switches will be reduced by using Fast I/O which will occur in the context of the user-mode thread. (Fast I/O involves bypassing the I/O subsystem and copying data directly to the output registers.) Moreover, in order to avoid out-of-order send/receive for a given tunnel, the send and receive may be serialized.

When a packet is to be sent to the remote end, upon arriving at the SSTPDRV 424 the following actions may be taken.

- The NDIS packet will be queued as it is at the SSTPDRV 424
- If the SSTPDRV 424 doesn't already have the FastIO in progress (denoted by the presence/absence of a Send Trigger IRP), it just continues queuing the packets
- If the Send trigger IRP is already with the SSTPDRV 424, complete the IRP to indicate to user-mode that there are packets to send
- The user-mode will queue a work item to its thread pool to PULL the bytes from the kernel mode. This has 2 advantages—serialization as there is only one work item per tunnel and the second—scaling with the number of processors (since work items from different tunnels can span across processors to utilize the CPU resource to the best possible extent)
- When the work item executes, it will do a FastIO to fetch the bytes to send and queue the buffer with HTTP layer to do the send operation asynchronously and proceed the fetch with a new buffer till the time the FastIO returns 0 bytes. This reduces the context switches associated with typical asynchronous completion using 110 completion ports and also the buffer requirements at the kernel (for the async buffers) is no longer a requirement
- If MaxNumWorkerIterations is reached, even though FastIO has been going through, reschedule the work item so as the next available work item gets executed. This will allow fair-bandwidth availability.
- If the FastIO returns 0 bytes to be sent, the Send trigger IRP will be queued back again.

When receiving data, the HTTP layer will indicate the received bytes to the SSTPSRV 410 (through I/O completion ports or other asynchronous callback mechanisms). The following sequence of operations may occur:

- The received buffer gets queued at the service after getting packets from HTTP layer 412
- If the work item to process received bytes is already in progress, nothing needs to be done. Otherwise, queue the work item.
- In the work item, keep doing FastIO request to indicate the received bytes. The SSTPDRV 424 will handle the processing of the received bytes from the FastIO routine itself. This provides serialization as well as reduces the context switches.
- The received frames will be delineated and copied by the NDIS layer to be presented to the upper driver layers
- If the number of buffers indicated to the miniport exceeds MaxNumWorkerIterations, re-queue the work item. This is again to avoid run-away tunnels wherein high data transfer on one tunnel reduces bandwidth availability or processing time available to another tunnel.

Additionally, TCP Nagle, that is, low-level packet buffering will be turned off to allow immediate send and receive operations. Buffer sizes may be picked to be large enough so that the TCP connection is utilized to the highest rate possible.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method for establishing secure tunneling over a connection between a first computing device and a second computing device, the method comprising:
   - initiating a secure session between the first computing device and the second computing device; and
   - initiating a secure socket tunneling protocol (SSTP) tunnel over the secure session, wherein the SSTP tunnel is configured to support a fast reconnect for restoring a broken lower-layer connection between the first computing device and the second computing device while maintaining the secure connection.

2. The method of claim 1, wherein an SSTP driver activates a state machine for managing the SSTP protocol that establishes the SSTP tunnel.

3. The method of claim 1, wherein the broken lower-layer connection is a point-to-point protocol (PPP) connection and the secure connection is a hypertext transfer protocol secure (HTTPS) connection.

4. The method of claim 1, wherein initiating a secure socket tunneling protocol (SSTP) tunnel over the secure session includes sending control packets and data packets, the control packet including messages for at least one of: a connect_request, a connect_ack including a link cookie, a connect_nack, a call_connected, a fast_reconnect_request, a fast_reconnect_ack, an echo_request, an echo_response, a disconnect, a disconnect_ack, and an abort_call.

5. The method of claim 4, further comprising forwarding the data packets to a hypertext transfer protocol secure (HTTPS) port.

6. The method of claim 1, further comprising passing a cookie to the first computing device for use in restoring the broken lower-layer connection.

7. The method of claim 6, wherein the cookie identifies a session associated with the broken lower-layer connection.

8. A computer storage medium having stored thereon computer executable instructions that when executed by a processor perform a method for establishing secure tunneling over a connection between a first computing device and a second computing device, the method comprising:
   - initiating a secure session between the first computing device and the second computing device; and
   - initiating a secure socket tunneling protocol (SSTP) tunnel over the secure session, wherein the SSTP tunnel is configured to support a fast reconnect for restoring a broken lower-layer connection between the first computing device and the second computing device while maintaining the secure connection.

9. The computer storage medium of claim 8, wherein an SSTP driver activates a state machine for managing the SSTP protocol that establishes the SSTP tunnel.

10. The computer storage medium of claim 8, wherein the broken lower-layer connection is a point-to-point protocol (PPP) connection and the secure connection is a hypertext transfer protocol secure (HTTPS) connection.

11. The computer storage medium of claim 8, wherein initiating a secure socket tunneling protocol (SSTP) tunnel over the secure session includes sending control packets and data packets, the control packet including messages for at least one of: a connect_request, a connect_ack including a link cookie, a connect_nack, a call_connected, a fast_reconnect_request, a fast_reconnect_ack, an echo_request, an echo_response, a disconnect, a disconnect_ack, and an abort_call.

12. The computer storage medium of claim 11, wherein the control packets and the data packets comprise a header common to both the control packets and the data packets.

13. The computer storage medium of claim 11, further comprising forwarding the data packets to a hypertext transfer protocol secure (HTTPS port.

14. The computer storage medium of claim 8, further comprising passing a cookie to the first computing device for use in restoring the broken lower-layer connection.

15. The computer storage medium of claim 14, wherein the cookie identifies a session associated with the broken lower-layer connection.

16. A system comprising:
one or more processors; and
a memory coupled to the one or more processors, the memory for storing instructions which, when executed by the one or more processors, cause the one or more processors to perform a method for establishing secure tunneling over a connection between a first computing device and a second computing device, the method comprising:

initiating a secure session between the first computing device and the second computing device; and initiating a secure socket tunneling protocol (SSTP) tunnel over the secure session, wherein the SSTP tunnel is configured to support a fast reconnect for restoring a broken lower-layer connection between the first computing device and the second computing device while maintaining the secure connection.

17. The system of claim 16, wherein the broken lower-layer connection is a point-to-point protocol (PPP) connection and the secure connection is a hypertext transfer protocol secure (HTTPS) connection.

18. The system of claim 16, wherein initiating a secure socket tunneling protocol (SSTP) tunnel over the secure session includes sending control packets and data packets, the control packet including messages for at least one of: a connect_request, a connect_ack including a link cookie, a connect_nack, a call_connected, a fast_reconnect_request, a fast_reconnect_ack, an echo_request, an echo_response, a disconnect, a disconnect_ack, and an abort_call.

19. The system of claim 16, further comprising instructions for passing a cookie to the first computing device for use in restoring the broken lower-layer connection.

20. The system of claim 19, wherein the cookie identifies a session associated with the broken lower-layer connection.

* * * * *